United States Patent
Lei

(10) Patent No.: US 10,252,634 B2
(45) Date of Patent: Apr. 9, 2019

(54) POWER SUPPLY APPARATUS

(71) Applicant: Shenzhen Carku Technology Co., Ltd., Shenzhen (CN)

(72) Inventor: Yun Lei, Shenzhen (CN)

(73) Assignee: SHENZHEN CARKU TECHNOLOGY CO., LTD., Bantian, Longgang District, Shenzhen (CN)

( * ) Notice: Subject to any disclaimer, the term of this patent is extended or adjusted under 35 U.S.C. 154(b) by 153 days.

(21) Appl. No.: 15/209,759

(22) Filed: Jul. 14, 2016

(65) Prior Publication Data

US 2017/0368957 A1    Dec. 28, 2017

(30) Foreign Application Priority Data

Jun. 27, 2016    (CN) .......................... 2016 1 0478502

(51) Int. Cl.
*B60L 11/18* (2006.01)
*H02J 7/34* (2006.01)
*H02J 7/00* (2006.01)

(52) U.S. Cl.
CPC ......... *B60L 11/1861* (2013.01); *H02J 7/0021* (2013.01); *H02J 7/0024* (2013.01); *H02J 7/0054* (2013.01); *H02J 7/0081* (2013.01); *H02J 7/345* (2013.01)

(58) Field of Classification Search
CPC . B60L 11/1861; B60L 11/1866; H02J 7/0021; H02J 7/0024; H02J 7/0054; H02J 7/0081; H02J 7/34; H02J 7/345; Y02T 10/7055; Y02T 10/7061; Y02T 10/7066
See application file for complete search history.

(56) References Cited

U.S. PATENT DOCUMENTS

| | | | |
|---|---|---|---|
| 6,936,994 B1 * | 8/2005 | Gimlan | B60L 8/003 320/101 |
| 9,966,780 B2 * | 5/2018 | Sherstyuk | H02J 7/007 |
| 2002/0041174 A1 | 4/2002 | Purkey | |
| 2003/0042873 A1 | 3/2003 | Osada et al. | |
| 2007/0159007 A1 * | 7/2007 | King | B60L 11/1864 307/71 |
| 2012/0025755 A1 * | 2/2012 | Xu | H01M 10/5006 320/103 |

(Continued)

FOREIGN PATENT DOCUMENTS

| | | |
|---|---|---|
| EP | 2553789 A1 | 2/2013 |
| FR | 2928049 A1 | 8/2009 |

OTHER PUBLICATIONS

The Extended European Search Report for EP16189145.2.

*Primary Examiner* — Levi Gannon
(74) *Attorney, Agent, or Firm* — Jun He Law Offices P.C.; James J. Zhu

(57) ABSTRACT

A power supply apparatus and method for providing electric energy to a target system are provided. The power supply apparatus includes: a capacitor module configured to store electric charge and provide electric energy to a target system based on the stored electric charge; an internal battery module configured to be operably connected with the capacitor module in series; and an output interface configured to couple the internal battery module with the capacitor module. The internal battery module and the capacitor module provide electric energy to the target system in controllable series connection through the output interface.

20 Claims, 11 Drawing Sheets

(56) References Cited

U.S. PATENT DOCUMENTS

2012/0150372 A1\* 6/2012 Chiang ................ B60L 11/005
  701/22
2013/0009461 A1 1/2013 Reichow et al.
2016/0049819 A1 2/2016 Butler et al.

\* cited by examiner

POWER SUPPLY APPARATUS

CROSS REFERENCE TO RELATED APPLICATIONS

This application claims priority to Chinese Patent Application Number 201610478502.4 filed on Jun. 27, 2016, the entire content of which is incorporated herein by reference.

TECHNICAL FIELD

The present disclosure relates to power supply technology, and more particularly, to power supply apparatus and power supply method.

BACKGROUND

Generally, self-embedded power supply is configured in various vehicles, equipments, or electronic devices to provide electric energy to various internal components. For example, a car battery is configured in a car to supply power to various electronic devices therein. Besides, a car battery can be used to start the engine of a car. Usually, after being turned on, the engine can charge the car battery to ensure sufficient power of the car battery. However, due to reasons such as aging, damaging, or excessive discharge, the car battery may not have sufficient power to jump start the car. Some emergency power supply devices are used in cars to jump start the car when the car battery is unable to jump start the car.

Similarly, other various emergency power supplies (such as Charge Pal) are also used to provide emergency power to various target systems (such as computers, stereos, cell phones, etc.). However, in the prior art the emergency power supply devices are basically comprised with only batteries, which have deficiency in a low temperature effect, a short life circle, and a low usage efficiency.

SUMMARY

One aspect of the disclosure provides a power supply apparatus for providing electric energy to a target system, including: a capacitor module configured to store electric charge and can provide electric energy to a target system based on the stored electric charge; an internal battery module configured to be operably connected with the capacitor module in series; and an output interface configured to couple the internal battery module with the capacitor module. The internal battery module and the capacitor module provide electric energy to the target system in controllable series connection through the output interface.

In some embodiments, the power supply apparatus also includes an internal charging current path which operably couples the internal battery module with the capacitor module, wherein the internal charging current path includes a first charging switch. The first charging switch is configured to receive a first charging control signal and to close or open under the control of the first charging control signal in order to enable or disable the internal battery module to charge the capacitor module.

In some embodiments, the first charging switch is a MOS transistor or a relay switch.

In some embodiments, the internal charging current path also includes a first voltage regulator module which is configured to controllably regulate the charging voltage of the capacitor module.

In some embodiments, the power supply apparatus also includes an external charging current path which operably couples an external power supply with the capacitor module, wherein the external charging current path includes a second charging switch. The second charging switch is configured to receive a second charging control signal and to close or open under the control of the second charging control signal in order to enable or disable the external power supply to charge the capacitor module.

In some embodiments, the second charging switch is a MOS transistor or a relay switch.

In some embodiments, the internal charging current path also includes a second voltage regulator module which is configured to controllably regulate the charging voltage of the capacitor module.

In some embodiments, the external power supply is a 5V input power, a 12V input power, or a self-embedded power supply of the target system.

In some embodiments, the internal charging current path and the external charging current path share part of the path.

In some embodiments, a capacitor module voltage detection apparatus is also included. The capacitor module voltage detection apparatus is configured to detect the voltage of the capacitor module in order to controllably regulate the charging voltage of the capacitor module based on the voltage of the capacitor module.

In some embodiments, the power supply apparatus also includes a third charging current path which operably couples the external power supply with the internal battery module, wherein the third charging current path includes a third charging switch. The third charging switch is configured to receive a third charging control signal and to close or open under the control of the third charging control signal in order to enable or disable the external power supply to charge the internal battery module.

In some embodiments, the third charging switch is a MOS transistor or a relay switch.

In some embodiments, the third charging current path also includes a third voltage regulator module which is configured to controllably regulate the charging voltage of the capacitor module.

In some embodiments, the external power supply is a 5V input power or a 12V input power.

In some embodiments, the power supply apparatus also includes a fourth charging current path which operably couples the self-embedded power supply of the target system with the capacitor module, wherein the fourth charging current path includes a fourth charging switch. The fourth charging switch is configured to controllably close or open based on the voltage of the self-embedded power supply of the target system in order to enable or disable the self-embedded power supply of the target system to charge the capacitor module.

In some embodiments, the fourth charging switch is a MOS transistor or a relay switch.

In some embodiments, the power supply apparatus also includes a fifth switch which couples the capacitor module with the internal battery module, wherein the fifth switch is configured to receive a fifth control signal and to close or open under the control of the fifth control signal in order to enable or disable the series connection between the capacitor module and the internal battery module to provide electric energy to the target system.

In some embodiments, the power supply apparatus also includes a controller which is coupled to the fifth switch. The controller is configured to receive an external signal and to generate the fifth control signal based on the external signal.

In some embodiments, the fifth switch is a MOS transistor or a relay switch.

In some embodiments, the power supply apparatus also includes a voltage detection module which is operably coupled to the controller. The voltage detection module is configured to generate the external signal when the voltage of the self-embedded power supply of the target system is detected to be lower than a threshold voltage.

In some embodiments, the power supply apparatus also includes an input module which is operably coupled to the controller. The input module is configured to receive an input instruction from a user and to transform the input instruction into the external signal.

In some embodiments, the first, second, and third voltage regulator module include a step-up module and a step-down module separately, wherein the step-up module is configured to controllably raise the charging voltage of the capacitor module and the step-down module is configured to controllably lower the charging voltage of the capacitor module.

In some embodiments, the first, second, and third voltage regulator module share the step-up module and the step-down module.

In some embodiments, the power supply apparatus is a portable power supply component.

In some embodiments, the target system includes a car, wherein the output interface is coupled to a car battery of the car in order to start the car.

In some embodiments, the capacitor module includes a capacitor bank.

In some embodiments, the capacitor bank includes at least one supercapacitor.

Another aspect of the disclosure provides a power supply method for providing electric energy to the target system, including: providing a capacitor module and an internal battery module, wherein the capacitor module can be charged to store electric charge and can provide electric energy to the target system based on the stored electric charge; the internal battery module is configured to be operably connected with the capacitor module in series; providing an internal charging current path which operably couples the internal battery module with the capacitor module, wherein the internal charging current path includes a first charging switch which is configured to receive a first charging control signal and to close or open under the control of the first charging control signal in order to enable or disable the internal battery module to charge the capacitor module; providing an output interface which is configured to couple the internal battery module with the capacitor module, wherein the internal battery module and the capacitor module provide electric energy to the target system in controllable series connection through the output interface.

The foregoing is a summary of the present disclosure where simplification, generalization, and omitted details may exist. Therefore, it should be appreciated by those skilled in the art that this section of the present disclosure is not intended to limit the scope of the present disclosure by any means, but rather for exemplary illustration only. This summary section of the present disclosure is not intended to identify any key or essential features of the claimed subject matter, and is not intended to be used as a supplementary means to identify the scope of the claimed subject matter.

BRIEF DESCRIPTION OF THE DRAWINGS

The aforementioned features and other features of the present disclosure will be fully understood by reading the following description by referring to the accompanying drawings and the appended claims. It will be understood that, these accompanying drawings merely illustrate certain embodiments in accordance with the present disclosure and should not be considered as limitation to the scope of the present disclosure. The present disclosure will be described with more clarity and in more detail by referring to the accompanying drawings.

DETAILED DESCRIPTION

The following detailed description refers to the accompanying drawings which is a part of the present disclosure. Unless otherwise specified in the context, similar symbols usually represent similar components in accompanying drawings. The illustrative embodiments described in the detailed description, the accompanying drawings and the claims are not limiting, and other embodiments may be adopted, or modifications may be made without deviating from the spirit and subject of the present disclosure. It should be understood that the various aspects of the present disclosure described and graphically presented herein may be arranged, replaced, combined, divided and designed in many different configurations, and these different configurations are implicitly included in the present disclosure.

It should also be understood that the terms and phrases used herein are for the purpose of illustration and should not be considered to be limiting. "Include" and "contain" used herein, as well as variations hereof, are intended to contain the items enumerated thereafter, as well as equivalents hereof and additional items. "Comprised with" used herein and variations hereof are intended to only contain the items enumerated thereafter, as well as equivalents hereof. Unless otherwise specified or limited, terms of "couple", "connect", "link", and variations hereof are used in a broad sense, and cover direct or indirect coupling, connection, and link.

Figure 1:
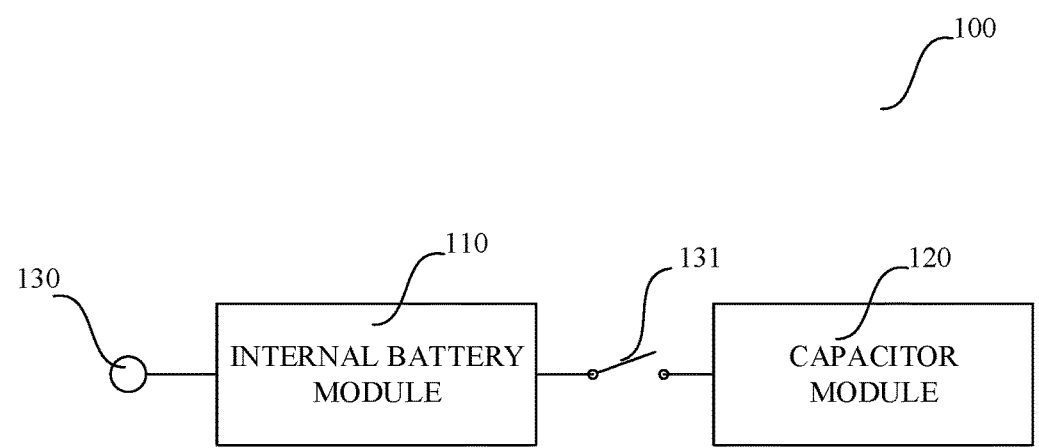
FIG. 1 is a structure diagram illustrating a starting power supply according to an exemplary embodiment of the present disclosure.

FIG. 1 is a diagram illustrating a starting power supply 100 according to an exemplary embodiment of the present disclosure. The starting power supply 100 is used to provide electric energy to a target system. In some embodiments, the starting power supply may start a vehicle (such as a car or a motorcycle) in replacement of a vehicle battery where the vehicle battery is unable to start the motor vehicle.

Referring to FIG. 1, the starting power supply 100 in this embodiment includes: an internal battery module 110, a capacitor module 120, and an output interface 130.

In some embodiments, the internal battery module 110 can be, for example, a battery pack including one or more batteries, or any other component that can store or provide electric energy. In some embodiments, the internal battery module 110 can be a rechargeable battery or a battery pack including multiple rechargeable batteries, such as a lithium rechargeable battery, a nickel-cadmium rechargeable battery, a nickel-metal hydride rechargeable battery, or any other type of rechargeable battery or battery pack. The internal battery module 110 is used to charge the capacitor module 120. In some embodiments, the internal battery module 110 is a lithium iron phosphate battery, wherein the voltage of a singular battery ranges from 2.0V to 3.65V. In some embodiments, the internal battery module 110 is a lithium cobalt oxide battery, wherein the voltage of a singular battery ranges from 2.7V to 4.35V.

In some embodiments, the capacitor module 120 is configured to store electric charge. In some embodiments, the capacitor module 120 can be a capacitor or multiple capacitors in series. In some embodiments, the capacitor within the capacitor module 120 can be selected from a supercapacitor, a farad capacitor, a hybrid capacitor, or a LiC capacitor. In some embodiments, the capacitor module 120 can be multiple supercapacitors in series. In some embodiments, every capacitor within the capacitor module 120 may have the same specification. In some embodiments, the capacitor module 120 may use five 470 F/2.7V capacitors in series. In other embodiments, the capacitor module 120 may use other quantities of capacitors in series.

In some embodiments, the output interface 130 is configured to couple the internal battery module 110 with the capacitor module 120. The internal battery module 110 and the capacitor module 120 provide output current outwards based on a predetermined voltage through the output interface 130 through controllable series connection. In some embodiments, the output interface 130 is configured to be coupled to the positive electrode of the internal battery module 110. In some embodiments, the internal battery module 110 and the capacitor module 120 provide output current outwards based on a predetermined voltage through a switch 131 in controllable series connection. In some embodiments, the output interface 130 is matched to an ignition interface of a car engine in order to start the car in replacement of a car battery. In some embodiments, the predetermined voltage is the voltage suitable for starting a car.

Figure 2:
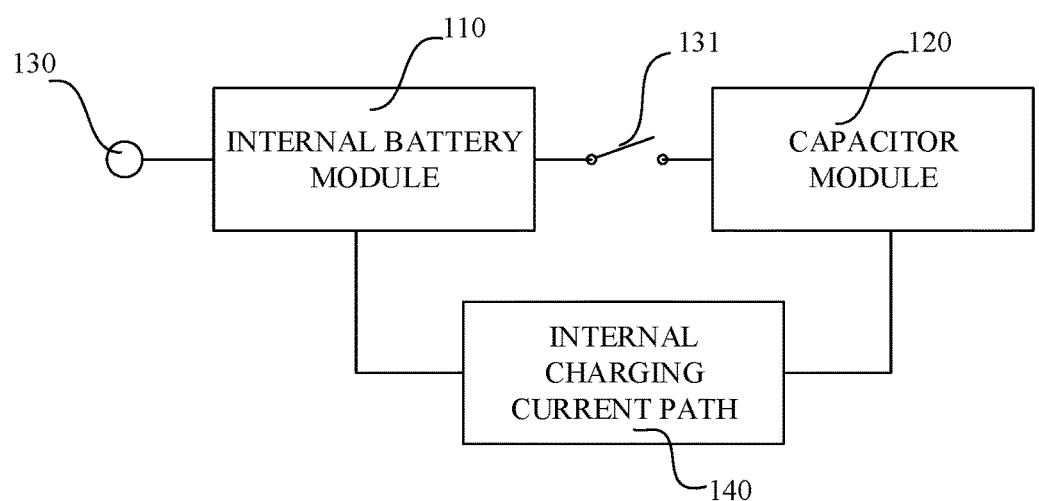
FIG. 2 is a structure diagram illustrating a starting power supply charging a capacitor bank through an internal charging current path according to an exemplary embodiment of the present disclosure.
Figure 3:
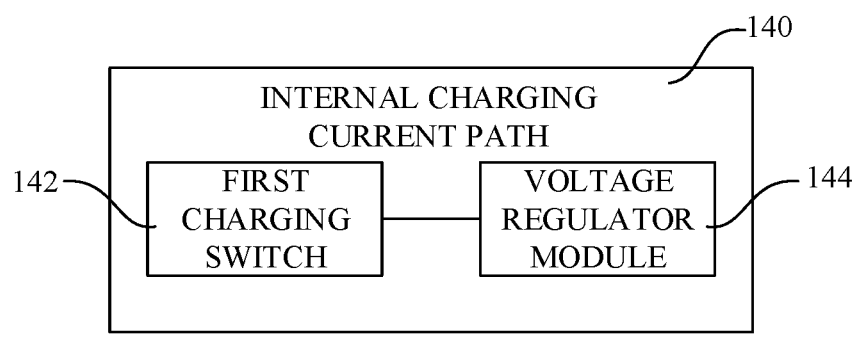
FIG. 3 is a structure diagram illustrating an internal charging current path according to an exemplary embodiment of the present disclosure.

Referring to FIG. 2 and FIG. 3, the starting power supply 100 of this embodiment also includes an internal charging current path 140. The internal charging current path 140 operably couples the internal battery module 110 with the capacitor module 120 to enable the internal battery module 110 to operably charge the capacitor module 120. In some embodiments, the internal charging current path 140 includes a first charging switch 142 and a voltage regulator module 144. In some embodiments, the first charging switch 142 is configured to receive a first charging control signal and to close or open under the control of the first charging control signal in order to enable or disable the internal battery module 110 to charge the capacitor module 120. In some embodiments, the first charging switch 142 is a controllable switch, such as a relay, a MOS transistor, a Field Effect Transistor, or an Insulated Gate Bipolar Transistor (IGBT). In some other embodiments, the first charging switch 142 is a manual switch. In some embodiments, the first charging switch 142 includes a MOS transistor and a voltage stabilizing diode. In this case, the positive electrode of the voltage stabilizing diode is coupled to the source electrode of the MOS transistor, the negative electrode of the voltage stabilizing diode is coupled to the drain electrode of the MOS transistor, and the grid electrode of the MOS transistor receives the first charging control signal. Under the control of the first charging control signal, the grid electrode of the MOS transistor opens or closes in order to close or open the first charging switch 142.

In some embodiments, the voltage regulator module 144 is configured to raise the charging voltage of the capacitor module 120. In some embodiments, the voltage regulator module 144 is a boost step-up circuit including an input terminal, an inductance, a diode, a switch transistor, a voltage stabilizing filter capacitor, a pulse width modulation (PWM) generator, and an output terminal. In this case, the PWM signal output by the PWM generator has a high level and a low level within one period and the ratio between a high level period and the whole period is defined as duty cycle. When the PWM signal is in the high level period, the switch transistor is on, the diode is off, and the inductance of the boost step-up circuit is charged to store energy. When the PWM signal is in a low level period, the switch transistor is off, the diode is on, and the inductance releases energy. Suppose that the induced electromotive force generated by the inductance is VL, then Vout=Vin+VL. Herein VL is relevant to Vin and duty cycle. In some embodiments, the voltage regulator module 144 can be a BUCK and BOOST circuit which includes a step-up circuit and a step-down circuit in order to controllably raise or lower the charging voltage of the capacitor module 120. In some embodiments, the starting power supply 100 also includes a capacitor module 120 voltage detection apparatus (not shown) which is configured to detect the voltage of the capacitor module 120. In some embodiments, when the capacitor module voltage detection apparatus detects that the voltage of the capacitor module 120 is low, whereas the voltage provided by the internal battery module is high, the capacitor module voltage detection apparatus transmits a corresponding signal to a processor which generates a control signal to control the BUCK or BOOST circuit to lower the voltage provided by the internal battery module based on the detected voltage and the voltage provided by the internal battery module in order to prevent excessively high charging voltage of the capacitor module 120. In some embodiments, when the capacitor module voltage detection apparatus detects that the voltage of the capacitor module 120 is high, whereas the voltage provided by the internal battery module is low, the capacitor module voltage detection apparatus transmits a corresponding signal to the processor which generates a control signal to control the BUCK or BOOST circuit to raise the voltage provided by the internal battery module based on the detected voltage and the voltage provided by the internal battery module. In some embodiments, the capacitor module voltage detection apparatus detects the voltage of the capacitor module 120 in real time, and the processor adjusts the BUCK or BOOST circuit to lower or raise the voltage of the internal battery module 110 based on the detected voltage in order to safely charge the capacitor module 120 to a predetermined voltage, such as 13.5V, 15V, or other voltage.

Figure 4:
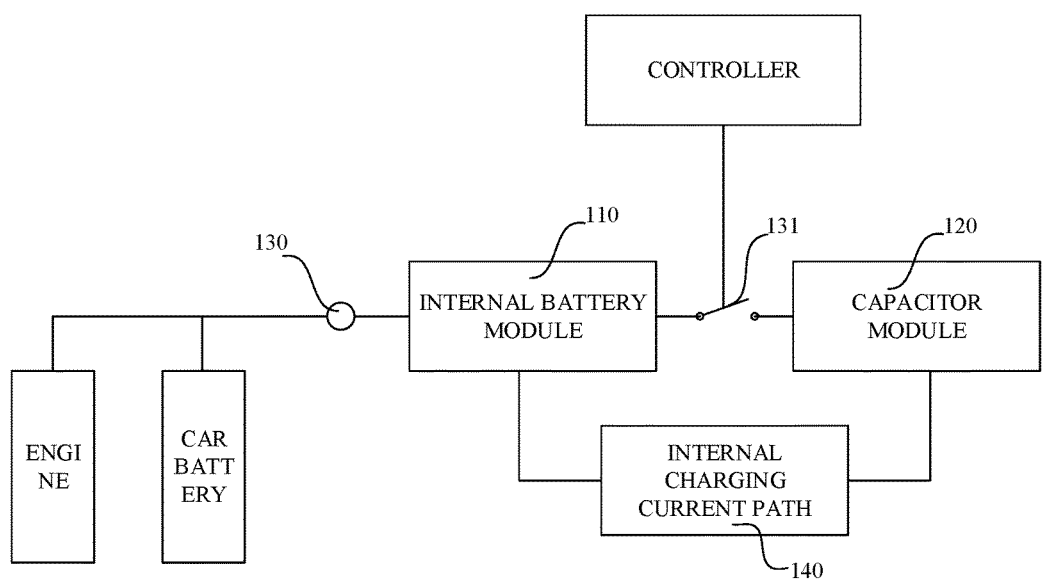
FIG. 4 is a structure diagram illustrating a starting power supply starting a car under the control of a controller.

Referring to FIG. 4, in some embodiments, the starting power supply 100 according to an exemplary embodiment of the present disclosure includes a controller and a voltage detection module (not shown), wherein the voltage detection module is coupled to the controller and the controller is coupled to the switch 131. The voltage detection module is configured to detect the voltage of a car battery. When the voltage detection module detects that the voltage of the car battery is lower than a threshold voltage, the voltage detection module generates an external signal and transmits the external signal to the controller which, after receiving the external signal, generates a fifth control signal. Under the control of the fifth control signal, the switch 131 closes in order to enable the internal battery module 110 and the capacitor module 120 to start an engine in series.

Figure 5:
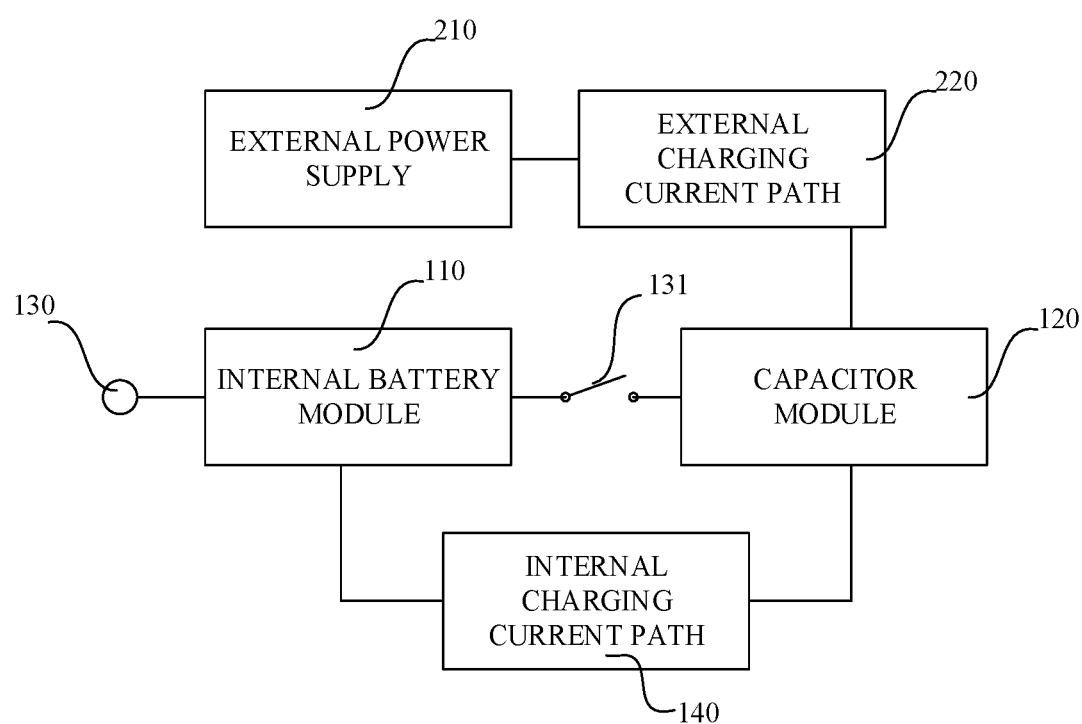
FIG. 5 is a structure diagram illustrating an external power supply charging a capacitor module through an external charging current path according to an exemplary embodiment of the present disclosure.
Figure 6:
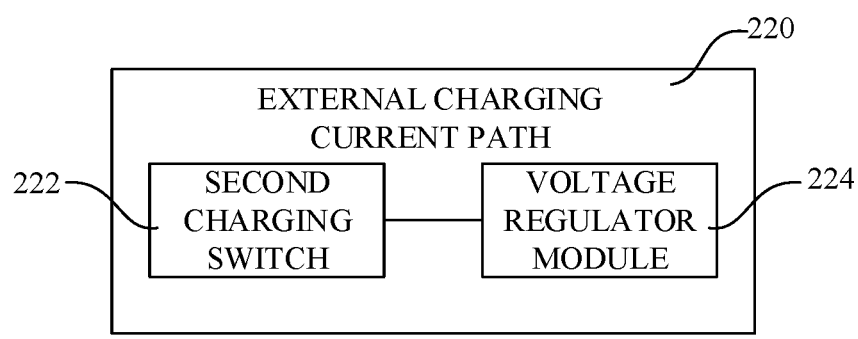
FIG. 6 is a structure diagram illustrating an external charging current path according to an exemplary embodiment of the present disclosure.

Referring to FIG. 5 and FIG. 6, the starting power supply 100 according to an exemplary embodiment of the present disclosure includes an external charging current path 220 which operably couples an external power supply 210 with the capacitor module 120, wherein the external charging current path 220 includes a second charging switch 222 and a voltage regulator module 224. In some embodiments, the second charging switch 222 is configured to receive a second charging control signal and to close or open under the control of the second charging control signal in order to enable or disable the external power supply 210 to charge the capacitor module 120. In some embodiments, the second charging switch 222 is a controllable switch, such as a relay, a MOS transistor, a Field Effect Transistor, or an Insulated Gate Bipolar Transistor (IGBT). In some other embodiments, the second charging switch 222 is a manual switch. In some embodiments, the second charging switch 222 includes a MOS transistor and a voltage stabilizing diode, wherein the positive electrode of the voltage stabilizing diode is coupled to the source electrode of the MOS transistor, the negative electrode of the voltage stabilizing diode is coupled to the drain electrode of the MOS transistor, and the grid electrode of the MOS transistor receives the second charging control signal. Under the control of the first charging control signal, the grid electrode of the MOS transistor opens or closes in order to close or open the second charging switch 222.

In some embodiments, the external power supply is a 5V input power, a 12V input power, or a self-embedded power supply of the target system, such as a car battery. This embodiment enables the capacitor module 120 to be charged via an external charging current path through a car battery or other external power supplies when the capacitor module 120 runs out of energy. In some embodiments, the external charging current path 220 also includes several input interfaces, such as three input interfaces, wherein a first input interface corresponds to inputting a 5V input power, a second input interface corresponds to inputting a 12V input power, and a third input interface corresponds to inputting a car battery.

In some embodiments, the voltage regulator module 224 is configured to controllably regulate the charging voltage of the capacitor module 120. IN some embodiments, the voltage regulator module 224 is a BOOST step-up circuit including an input terminal, an inductance, a diode, a switch transistor, a voltage stabilizing filter capacitor, a pulse width modulation (PWM) generator, and an output terminal, wherein the PWM signal output by the PWM generator has high level and low level within one period and the ratio between the high level period and the whole period is defined as duty cycle. When the PWM signal is in the high level period, the switch transistor is on, the diode is off, and the inductance of the step-up module 224 is charged to store energy. When the PWM signal is in the low level period, the switch transistor is off, the diode is on, and the inductance releases energy. Suppose that the induced electromotive force generated by the inductance is VL, then Vout=Vin+VL. Herein VL is relevant to Vin and duty cycle. In some embodiments, the internal charging current path 140 and the external charging current path 220 can share the step-up module. In some embodiments, the voltage regulator module 224 can be a BUCK and BOOST circuit which includes a step-up circuit and a step-down circuit in order to controllably raise or lower the charging voltage of the capacitor module 120. In some embodiments, the starting power supply 100 also includes a capacitor module voltage detection apparatus (not shown) which is configured to detect the voltage of the capacitor module 120. In some embodiments, when the capacitor module voltage detection apparatus detects that the voltage of the capacitor module 120 is low, whereas the voltage provided by the external power supply is high, the capacitor module voltage detection apparatus transmits a corresponding signal to a processor which generates a control signal to control the BUCK or BOOST circuit to lower the voltage provided by the external power supply based on the detected voltage and the voltage provided by the external power supply in order to prevent excessively high charging voltage of the capacitor module 120. In some embodiments, when the capacitor module voltage detection apparatus detects that the voltage of the capacitor module 120 is high, whereas the voltage provided by the external power supply is low, the capacitor module voltage detection apparatus transmits a corresponding signal to the processor which generates a control signal to control the BUCK or BOOST circuit to raise the voltage provided by the external power supply based on the detected voltage and the voltage provided by the external power supply. In some embodiments, the capacitor module voltage detection apparatus detects the voltage of the capacitor module 120 in real time, and the processor adjusts the BUCK or BOOST circuit to lower or raise the voltage of the external power supply 210 based on the detected voltage in order to safely charge the capacitor module 120 to a predetermined voltage, such as 13.5V, 15V, or other voltage.

Figure 7:
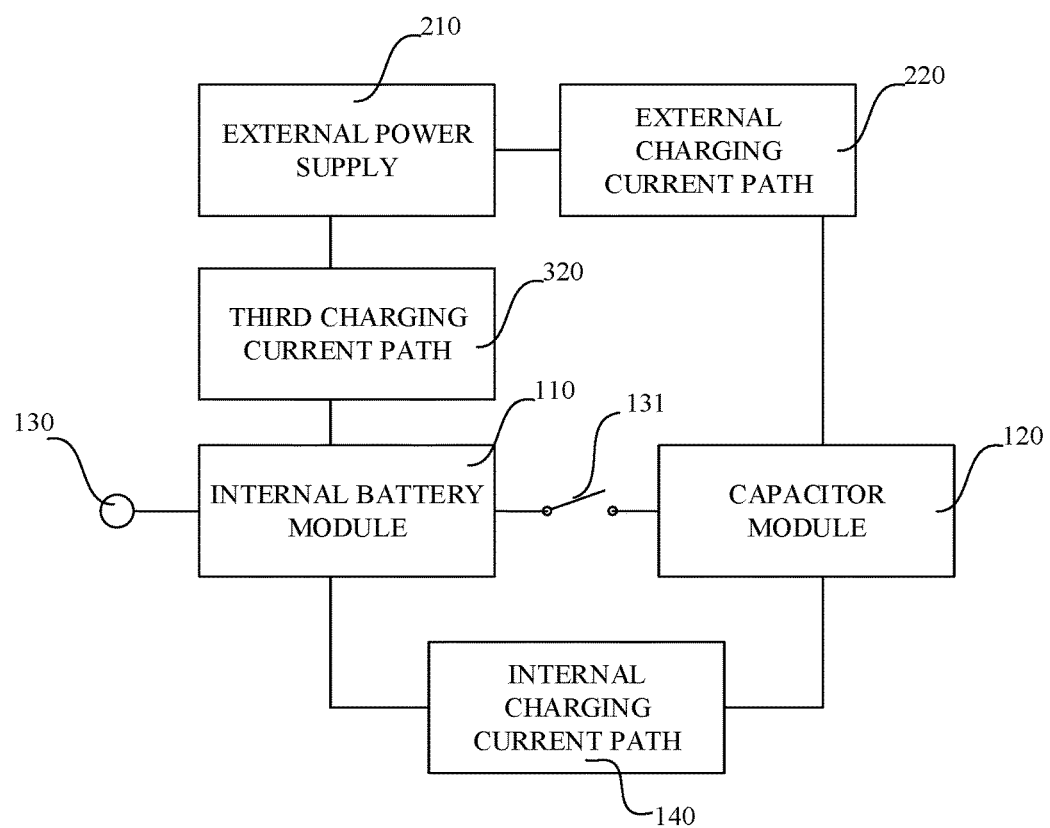
FIG. 7 is a structure diagram illustrating an external power supply charging an internal battery module through a third charging current path according to an exemplary embodiment of the present disclosure.
Figure 8:
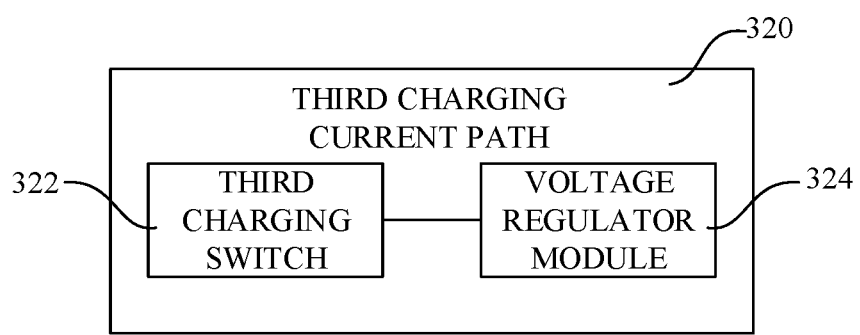
FIG. 8 is a structure diagram illustrating a third charging current path according to an exemplary embodiment of the present disclosure.

Referring to FIG. 7 and FIG. 8, the starting power supply 100 according to an exemplary embodiment of the present disclosure includes a third charging current path 320. In some embodiments, the third charging current path 320 operably couples the external power supply 210 with the internal battery module 110. In some embodiments, the third charging current path 320 includes a third charging switch 322 and a voltage regulator module 324. In some embodiments, the third charging switch 322 is configured to receive a third charging control signal and to close or open under the control of the third charging control signal in order to enable or disable the external power supply 210 to charge the internal battery module 110. In some embodiments, the third charging switch 322 is a controllable switch, such as a relay, a MOS transistor, a Field Effect Transistor, or an Insulated Gate Bipolar Transistor (IGBT). In some other embodiments, the third charging switch 322 is a manual switch. In some embodiments, the third charging switch 322 includes a MOS transistor and a voltage stabilizing diode, wherein the positive electrode of the voltage stabilizing diode is coupled to the source electrode of the MOS transistor, the negative electrode of the voltage stabilizing diode is coupled to the drain electrode of the MOS transistor, and the grid electrode of the MOS transistor receives the first charging control signal. Under the control of the third charging control signal, the grid electrode of the MOS transistor opens or closes in order to close or open the third charging switch 322.

In some embodiments, the voltage regulator module 324 is configured to controllably raise or lower the charging voltage of the internal battery module 110. In some embodiments, the step-down module 324 is a BUCK or a BOOST circuit.

In some embodiments, the internal charging current path 140, the external charging current path 220, and the third charging current path 320 can share partial units.

Figure 9:
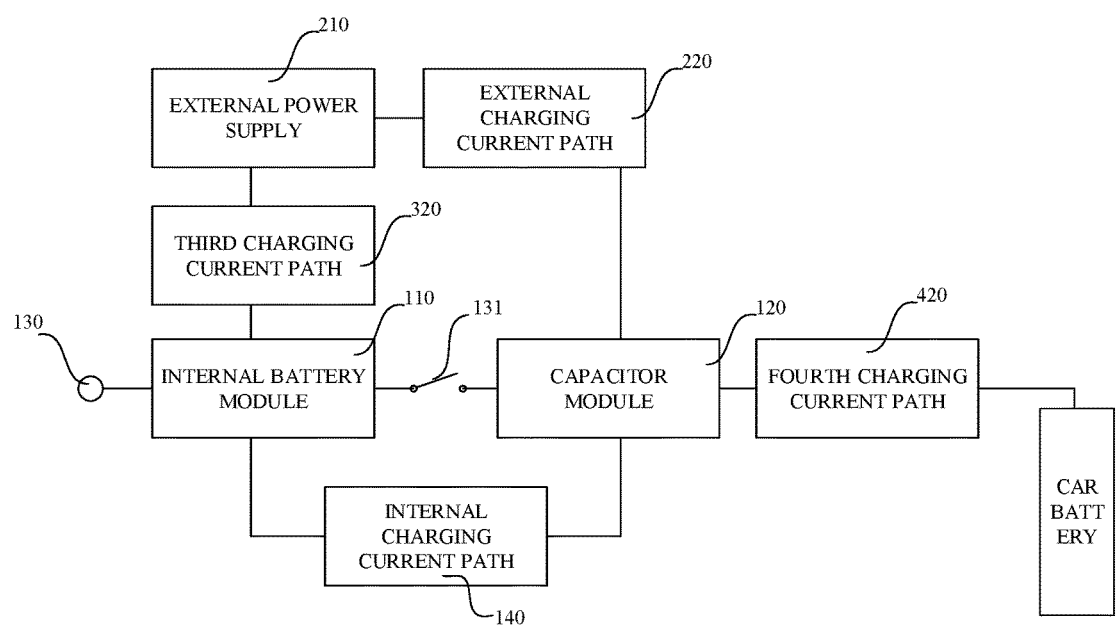
FIG. 9 is a structure diagram illustrating a car battery charging a capacitor module through a fourth charging current path according to an exemplary embodiment of the present disclosure.
Figure 10:
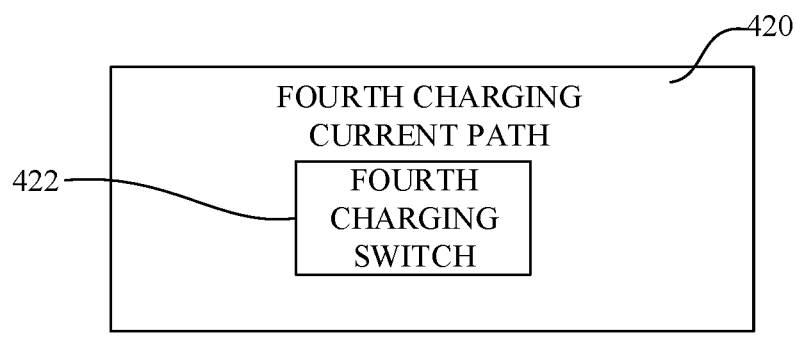
FIG. 10 is a structure diagram illustrating a fourth charging current path according to an exemplary embodiment of the present disclosure.

Referring to FIG. 9 and FIG. 10, the starting power supply 100 according to an exemplary embodiment of the present disclosure also includes a fourth charging current path 420 which operably couples a car battery with the capacitor module 120. In some embodiments, the fourth charging current path 420 includes a fourth charging switch 422, wherein the fourth charging switch 422 is configured to operably close or open based on the voltage of the self-embedded power supply of the target system in order to enable or disable the car battery to charge the capacitor module 120. It should be noted that, in some embodiments, when the voltage of the self-embedded power supply of the target system (for example, the voltage of a car battery) is higher than the predetermined charging voltage of the capacitor (for example, 13.5V), the car battery charges the capacitor module 120 via the fourth charging current path. When the car battery runs out of energy, the car battery charges the capacitor module 120 via the external charging current path 220.

The present disclosure also provides a power supply method for a target system, including following steps.

A capacitor module and an internal battery module is provided, wherein the capacitor module can be charged to store electric charge and can provide electric energy to the target system based on the stored electric charge; the internal battery module is configured to be operably connected with the capacitor module in series.

An internal charging current path which operably couples the internal battery module with the capacitor module is provided, wherein the internal charging current path includes a first charging switch which is configured to receive a first charging control signal and to close or open under the control of the first charging control signal in order to enable or disable the internal battery module to charge the capacitor module.

An output interface which is configured to couple the internal battery module with the capacitor module is provided, wherein the internal battery module and the capacitor module provide electric energy to the target system in controllable series connection through the output interface.

In some embodiments, the power supply method for a target system also includes providing an external charging current path which operably couples an external power supply with the capacitor module, wherein the external charging current path includes a second charging switch which is configured to receive a second charging control signal and to close or open under the control of the second charging control signal in order to enable or disable the external power supply to charge the capacitor module.

In some embodiments, the power supply method for a target system also includes providing a third charging current path which operably couples the external power supply with the internal battery module, wherein the third charging current path includes a third charging switch which is configured to receive a third charging control signal and to close or open under the control of the third charging control signal in order to enable or disable the external power supply to charge the internal battery module.

In some embodiments, the power supply method for a target system also includes providing a fourth charging current path which operably couples a self-embedded power supply of the target system with the capacitor module, wherein the fourth charging current path includes a fourth charging switch which is configured to controllably close or open based on the voltage of the self-embedded power supply of the target system in order to enable or disable the self-embedded power supply of the target system to charge the capacitor module.

In some embodiments, the power supply method for a target system also includes providing a fifth switch which couples the capacitor module with the internal battery module, wherein the fifth switch is configured to receive a fifth control signal and to close or open under the control of the fifth control signal in order to enable or disable the series connection between the capacitor module and the internal battery module to provide electric energy to the target system.

Figure 11:
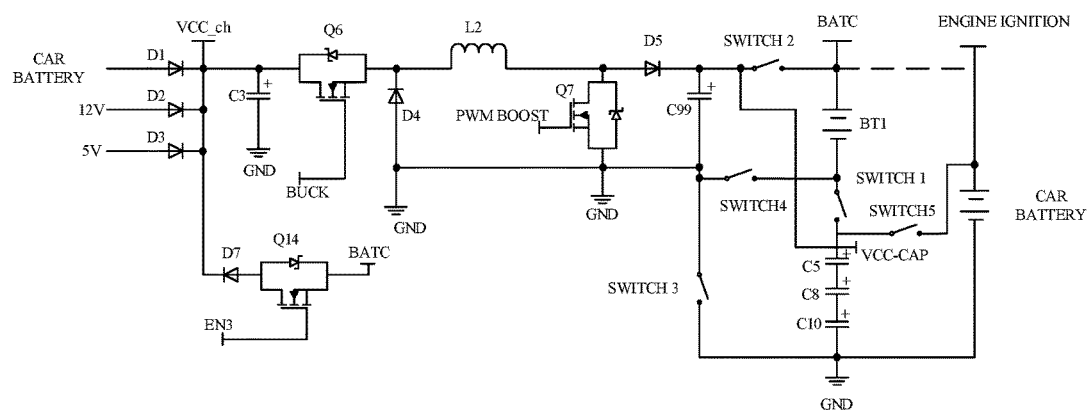
FIG. 11 is a structure diagram illustrating the circuit structure of a starting power supply according to an exemplary embodiment of the present disclosure.

Referring to FIG. 11 which is a circuit diagram of the starting power supply 100 according to an exemplary embodiment of the present disclosure. The starting power supply 100 includes: a battery pack BT1 including several batteries. In this case, the battery pack BT1 is the internal battery module. Moreover, the negative electrode of the battery pack BT1 is coupled to one end of the switch 1, and the other end of the switch 1 is coupled to one end of a capacitor bank formed by a capacitor C5, a capacitor C8, and a capacitor C10 in series, wherein the capacitor bank is the capacitor module. The other end of the capacitor bank is coupled to one end of a switch 3 and is grounded. The other end of the switch 3 is coupled to one end of a switch 4, and the other end of the switch 4 is coupled to the negative electrode of the battery pack BT1. Moreover, the other end of the switch 3 is also coupled to one end of a capacitor C99, and the other end of the capacitor C99 is coupled to one end of a switch 2 and one end of a capacitor bank formed by a capacitor C5, a capacitor C8, and a capacitor C10 in series. The other end of the switch 2 is coupled to the positive electrode of the battery pack BT1. The other end of the capacitor C99 is also coupled to the negative electrode of a diode D5, the positive electrode of the diode D5 is coupled to one end of an inductance L2 and one end of a switch Q7, and the other end of the switch Q7 is coupled to one end of the switch 4, the other end of the switch 3, the positive electrode of a diode D4, and is grounded. In this case, the switch Q7 includes a MOS transistor and a voltage stabilizing diode, the positive electrode of the voltage stabilizing diode and the source electrode of the MOS transistor are coupled to form one end of the switch Q7, the negative electrode of the voltage stabilizing diode and the drain electrode of the MOS transistor are coupled to form the other end of the switch Q7, and the switch Q7 closes or opens under the control of the PWM_BOOST signal. The other end of the inductance L2 is coupled to one end of a switch Q6 and the negative electrode of the diode D4; the other end of the switch Q6 is coupled to one end of a capacitor C3, the negative electrode of a diode D1, the negative electrode of a diode D2, the negative electrode of a diode D3, and the negative electrode of a diode D7. In this case, the switch Q6 includes a MOS transistor and a voltage stabilizing diode, the positive electrode of the voltage stabilizing diode and the source electrode of the MOS transistor are coupled to form the other end of the switch Q6, and the negative electrode of the voltage stabilizing diode and the drain electrode of the MOS transistor are coupled to form one end of the switch Q6. Herein the switch Q6 closes or opens under the control of the BUCK signal. Moreover, the other end of the capacitor C3 is grounded. The positive electrode of the diode D7 is coupled to one end of a switch Q14, and the other end of the switch Q14 is coupled to the positive electrode of the battery pack BT1. Herein the switch Q14 includes a MOS transistor and a voltage stabilizing diode, the negative electrode of the voltage stabilizing diode and the source electrode of the MOS transistor are coupled to form the other end of the switch Q14, and the positive electrode of the voltage stabilizing diode and the drain electrode of the MOS transistor are coupled to form one end of the switch Q14. In this case, the switch Q14 closes or opens under the control of the EN3 signal. Herein the positive electrodes of the diode D1, diode D2, and diode D3 are input interfaces to input a car battery, a 12V power supply, and a 5V power supply separately. The other end of the switch 1 is also coupled to one end of a switch 5, and the other end of the switch 5 is also coupled to the positive electrode of the car battery. Moreover, the negative electrode of the car battery is coupled to the other end of the capacitor bank formed by the capacitor C5, the capacitor C8, and the capacitor C10 in series and is grounded.

The detailed structure of the starting power supply and the method for providing electric energy to a target system will be further illustrated as follows by referring to the circuit diagram of the starting power supply 100 shown in FIG. 11.

When the capacitor module is only charged by the internal battery module through the internal charging current path, the switches Q14, 3, and 4 close while the other switches all open. The BUCK or BOOST circuit containing the switch Q6, the diode D4, the inductance L2, the switch Q7, the diode D5, and the capacitor C99 controllably regulates the voltage of the internal battery module composed of the battery pack BT1 to charge the capacitor module containing the capacitor C5, the capacitor C8, and the capacitor C10. In some embodiments, the BUCK signal of Q6 and the PWM_BOOST signal of Q7 can be adjusted based on the actual voltage of the capacitor module in order to control and regulate the charging voltage of the capacitor module by the internal battery module through the BUCK signal and the PWM_BOOST signal. For example, the charging voltage of the capacitor module by the internal battery module is first lowered, then the charging voltage of the capacitor module is gradually raised until the capacitor module is charged to the predetermined voltage.

When the capacitor module is charged by the external power supply through the external charging current path, the switch 3 closes while the other switches all open. Moreover, the BUCK or BOOST circuit containing the switch Q6, the diode D4, the inductance L2, the switch Q7, the diode D5, and the capacitor C99 controllably regulates the voltage of the external power supply to charge the capacitor module including the capacitor C5, the capacitor C8, and the capacitor C10. In some embodiments, the BUCK signal of Q6 and the PWM_BOOST signal of Q7 can be adjusted based on the actual voltage of the capacitor module in order to control and regulate the charging voltage of the capacitor module by the external power supply through the BUCK signal and the PWM_BOOST signal. It should be noted that when the capacitor module is charged by the car battery through the external charging current path, the voltage of the car battery can be lower than the predetermined voltage of the charging of the capacitor module.

When the internal battery module is charged by the external power supply through the third charging current path, the switch 2 and 4 close while the other switches all open. Moreover, the BUCK or BOOST circuit including the switch Q6, the diode D4, the inductance L2, the switch Q7, the diode D5, and the capacitor C99 controllably regulates the voltage of the external power supply to charge the battery pack BT1. In some embodiments, the BUCK signal of Q6 and the PWM_BOOST signal of Q7 can be adjusted based on the actual voltage of the battery pack BT1 in order to control and regulate the charging voltage of the battery pack BT1 by the external power supply through the BUCK signal and the PWM_BOOST signal.

When the voltage of the car battery is higher than the predetermined voltage of the charging of the capacitor module, the capacitor module can be charged by the car battery through the fourth charging current path. Under this situation, the switch 5 closes while the other switches all open, and the capacitor module can be directly charged by the car battery until the predetermined voltage is reached.

In some embodiments, when electric energy is released outwards, the switch 1 closes while the other switches all open, and the car engine is started by full voltage such as 13.5V, 15V, or other voltage.

It should be noted that, although several modules or sub-modules of the starting power supply and the car starting power supply have been described in the previous paragraphs, such division is exemplary and not mandatory. Practically, according to the embodiments of the present disclosure, the functions and features of two or more modules described above may be embodied in one module. Conversely, the function and feature of any one module described above may be embodied in two or more modules.

It should also be appreciated by those skilled in the art that electronic hardware, software, or the combination of both can be implemented by referring to various exemplary methods, steps, and units described by various embodiments disclosed by the present disclosure. In order to clearly represent the interchangeability between hardware and software, various exemplary steps and units above are generally described according to functions thereof. Whether certain function is implemented as hardware or software depends on specific disclosure and design constraints applied on the whole system. The described functions may be implemented by those skilled in the art with variations towards every specific disclosure, however, this strategy of implementation should not be interpreted to cause any deviation from the scope of the present disclosure.

"Example/exemplary" used in the specification of the present disclosure represents using as an example, an illustration, or an explanation. Any "exemplary" technical scheme described in the specification should not be interpreted to be more optimal or to have more advantages than other technical schemes.

It should be noted that, although several modules or sub-modules of the starting power supply and the car starting power supply have been described in the previous paragraphs, such division is exemplary and not mandatory. Practically, according to the embodiments of the present disclosure, the functions and features of two or more modules described above may be embodied in one module.

Conversely, the function and feature of any one module described above may be embodied in two or more modules.

The present disclosure provides the above description of the disclosed technical content to enable those skilled in the art to implement or apply the present disclosure. Modifications and variations of these technical content are apparent to those skilled in the art, and general principles defined in the present disclosure can also be applied to other embodiments without departing from the spirit and scope of the present disclosure. Therefore, the present disclosure is not limited to the specific embodiments shown above, but should comply with the broadest range of the inventive concepts disclosed in the present disclosure.

Other variations to the disclosed embodiments can be understood and effected by those skilled in the art in practicing the claimed invention, from a study of the drawings, the disclosure, and the appended claims. In the claims, the word "comprise", "include" or "contain" does not exclude other elements or steps, and the indefinite article "a" or "an" does not exclude a plurality. Any reference signs in the claims should not be construed as limiting the scope. The scope and spirit of the present disclosure is defined by the appended claims.

What is claimed is:

1. A power supply apparatus for providing electric energy to a target system, comprising:
   a capacitor module configured to store electric charge and provide electric energy to a target system based on the stored electric charge;
   an internal battery module configured to be operably connected with the capacitor module in series; and
   an output interface coupled to the internal battery module, wherein the internal battery module and the capacitor module are capable of being controlled to provide electric energy to the target system in series through the output interface;
   wherein the power supply apparatus further comprises a third charging current path which operably couples an external power supply with the internal battery module, the third charging current path comprises a third charging switch, and the third charging switch is configured to receive a third charging control signal and to close or open under the control of the third charging control signal in order to enable or disable the external power supply to charge the internal battery module.

2. The power supply apparatus according to claim 1, wherein the power supply apparatus further comprises an internal charging current path which operably couples the internal battery module with the capacitor module;
   wherein the internal charging current path comprises a first charging switch, and the first charging switch is configured to receive a first charging control signal and to close or open under the control of the first charging control signal in order to enable or disable the internal battery module to charge the capacitor module.

3. The power supply apparatus according to claim 2, wherein the first charging switch is a MOS transistor or a relay switch.

4. The power supply apparatus according to claim 2, wherein the internal charging current path also comprises a first voltage regulator module configured to controllably regulate the charging voltage of the capacitor module.

5. The power supply apparatus according to claim 4, wherein the first voltage regulator module comprise a step-up module and a step-down module,
   wherein the step-up module is configured to controllably raise the charging voltage of the capacitor module;
   the step-down module is configured to controllably lower the charging voltage of the capacitor module.

6. The power supply apparatus according to claim 2, wherein the power supply apparatus further comprises an external charging current path which operably couples an external power supply with the capacitor module,
   the external charging current path comprises a second charging switch, and the second charging switch is configured to receive a second charging control signal and to close or open under the control of the second charging control signal in order to enable or disable the external power supply to charge the capacitor module.

7. The power supply apparatus according to claim 6, wherein the internal charging current path further comprises a second voltage regulator module configured to controllably regulate the charging voltage of the capacitor module.

8. The power supply apparatus according to claim 6, wherein the external power supply is a 5V input power, a 12V input power, or a self-embedded power supply of the target system.

9. The power supply apparatus according to claim 1, further comprising a capacitor module voltage detection apparatus, the capacitor module voltage detection apparatus being configured to detect the voltage of the capacitor module in order to controllably regulate the charging voltage of the capacitor module based on the voltage of the capacitor module.

10. The power supply apparatus according to claim 1, wherein the third charging current path further comprises a third voltage regulator module configured to controllably regulate the charging voltage of the capacitor module.

11. The power supply apparatus according to claim 1, wherein the power supply apparatus further comprises a fourth charging current path which operably couples a self-embedded power supply of the target system with the capacitor module, and
    the fourth charging current path comprises a fourth charging switch, and the fourth charging switch is configured to controllably close or open based on the voltage of the self-embedded power supply of the target system in order to enable or disable the self-embedded power supply of the target system to charge the capacitor module.

12. The power supply apparatus according to claim 1, wherein the power supply apparatus further comprises a fifth switch which couples the capacitor module with the internal battery module, and
    the fifth switch is configured to receive a fifth control signal and to close or open under the control of the fifth control signal in order to enable or disable the series connection between the capacitor module and the internal battery module to provide electric energy to the target system.

13. The power supply apparatus according to claim 12, wherein the power supply apparatus further comprises a controller coupled to the fifth switch, and the controller is configured to receive an external signal and to generate the fifth control signal based on the external signal.

14. The power supply apparatus according to claim 13, wherein the power supply apparatus further comprises a voltage detection module operably coupled to the controller, and
    the voltage detection module is configured to generate the external signal when the voltage of the self-embedded power supply of the target system is detected to be lower than a threshold voltage.

15. The power supply apparatus according to claim 13, wherein the power supply apparatus further comprises an input module operably coupled to the controller, and the input module is configured to receive an input instruction from a user and to transform the input instruction into the external signal.

16. The power supply apparatus according to claim 1, wherein the power supply apparatus is a portable power supply component.

17. The power supply apparatus according to claim 1, wherein the target system comprises a car, and the output interface is coupled to a car battery of the car in order to start the car.

18. The power supply apparatus according to claim 1, wherein the capacitor module comprises a capacitor bank and the capacitor bank comprises at least one super capacitor.

19. A power supply method for providing electric energy to a target system, comprising:

providing a capacitor module and an internal battery module, wherein the capacitor module is configured to store electric charge and provide electric energy to the target system based on the stored electric charge; and the internal battery module is configured to be operably connected with the capacitor module in series;

providing an internal charging current path operably coupling the internal battery module with the capacitor module, wherein the internal charging current path comprises a first charging switch configured to receive a first charging control signal and to close or open under the control of the first charging control signal in order to enable or disable the internal battery module to charge the capacitor module; and providing an output interface coupled to the internal battery module, wherein the internal battery module and the capacitor module provide electric energy to the target system in controllable series connection through the output interface;

providing a third charging current path which operably couples an external power supply with the internal battery module, wherein the third charging current path comprises a third charging switch, and the third charging switch is configured to receive a third charging control signal and to close or open under the control of the third charging control signal in order to enable or disable the external power supply to charge the internal battery module.

20. A power supply method for providing electric energy to a target system, comprising:

connecting an internal battery module with a capacitor module in series;

storing electric charge in the capacitor module and providing electric energy to the target system based on the stored electric charge; and establishing an internal charging current path between the internal battery module and the capacitor module, wherein a first charging switch of the internal charging current path receiving a first charging control signal and being closed or opened under the control of the first charging control signal in order to enable or disable the internal battery module to charge the capacitor module; and providing electric energy to the target system by the internal battery module and the capacitor module through an output interface, wherein the internal battery module and the capacitor module are connected in series;

establishing a third charging current path between an external power supply and the internal battery module, wherein a third charging switch of the third charging current path receiving a third charging control signal and being closed or opened under the control of the third charging control signal in order to enable or disable the external power supply to charge the internal battery module.

* * * * *